(12) United States Patent
Ohno et al.

(10) Patent No.: US 6,923,580 B2
(45) Date of Patent: Aug. 2, 2005

(54) OPTICAL TRANSMISSION MODULE

(75) Inventors: Katsuya Ohno, Fujisawa (JP); Tsutomu Kuroiwa, Ebina (JP); Osamu Yamada, Hiratsuka (JP); Toshikazu Ohtake, Yokohama (JP); Shigeru Tokita, Yokohama (JP)

(73) Assignee: OpNext Japan, Inc., Yokohama (JP)

( * ) Notice: Subject to any disclaimer, the term of this patent is extended or adjusted under 35 U.S.C. 154(b) by 328 days.

(21) Appl. No.: 10/238,338

(22) Filed: Sep. 9, 2002

(65) Prior Publication Data

US 2004/0042740 A1 Mar. 4, 2004

(30) Foreign Application Priority Data

Aug. 28, 2002 (JP) ........................................ 2002-248186

(51) Int. Cl.⁷ ................................................. G02B 6/36
(52) U.S. Cl. .......................................... 385/92; 385/94
(58) Field of Search .............................. 385/94, 92, 54, 385/89, 98, 51, 88, 43, 50, 56, 55

(56) References Cited

U.S. PATENT DOCUMENTS

| | | | | |
|---|---|---|---|---|
| 4,763,225 A | | 8/1988 | Frenkel et al. | |
| 4,946,246 A | * | 8/1990 | Shiga | 385/52 |
| 5,033,809 A | * | 7/1991 | Shiga | 385/51 |
| 5,548,677 A | * | 8/1996 | Kakii et al. | 385/92 |
| 5,675,685 A | * | 10/1997 | Fukuda et al. | 385/89 |
| 5,764,833 A | * | 6/1998 | Kakii et al. | 385/54 |
| 6,071,016 A | | 6/2000 | Ichino et al. | |
| 6,164,838 A | | 12/2000 | Maehara et al. | |
| 6,457,877 B2 | * | 10/2002 | Kato et al. | 385/92 |
| 6,508,595 B1 | | 1/2003 | Chan et al. | |
| 6,726,375 B2 | * | 4/2004 | Kato et al. | 385/88 |
| 2001/0009599 A1 | * | 7/2001 | Kato et al. | 385/92 |
| 2001/0043775 A1 | | 11/2001 | Shirakawa et al. | |
| 2002/0197026 A1 | * | 12/2002 | Kato et al. | 385/92 |
| 2004/0042740 A1 | * | 3/2004 | Ohno et al. | 385/92 |
| 2004/0091217 A1 | * | 5/2004 | Nawae et al. | 385/92 |

FOREIGN PATENT DOCUMENTS

| | | |
|---|---|---|
| EP | 0501571 A1 | 9/1992 |
| EP | 1039321 A2 | 9/2000 |
| JP | 07-104149 | 4/1995 |

* cited by examiner

Primary Examiner—Thien M. Le
(74) Attorney, Agent, or Firm—Townsend and Townsend and Crew LLP

(57) ABSTRACT

An optical transmission module includes a housing with a heat radiating fin and a receptacle for being connected to an external optical fiber. The module also includes a coaxial can stem for mounting an optical element and a ceramic printed circuit board. The signal transmission lines are provided on one side of the board, and heat from the coaxial can package is radiated from the radiating fin.

20 Claims, 2 Drawing Sheets

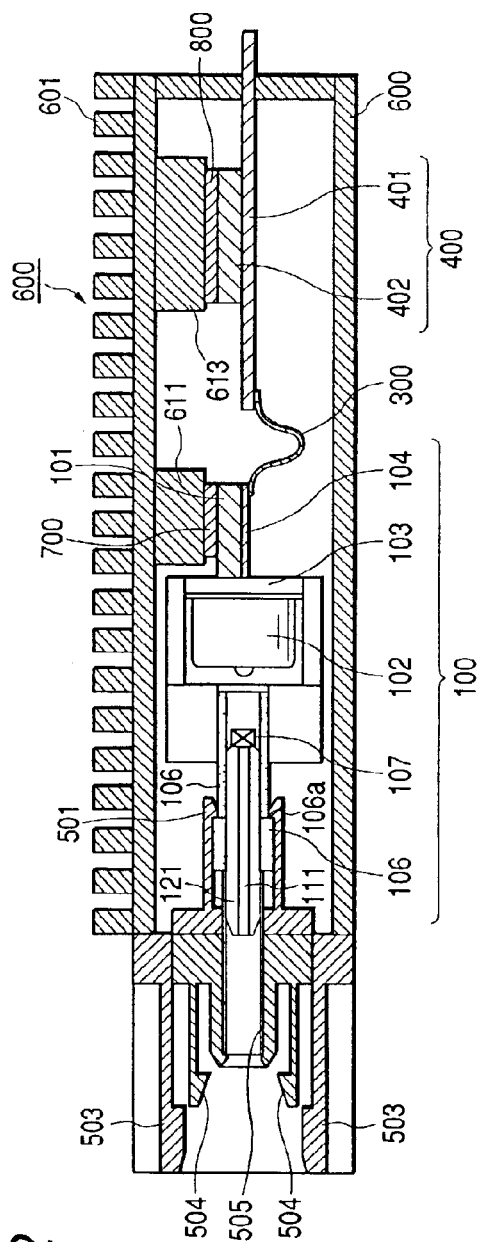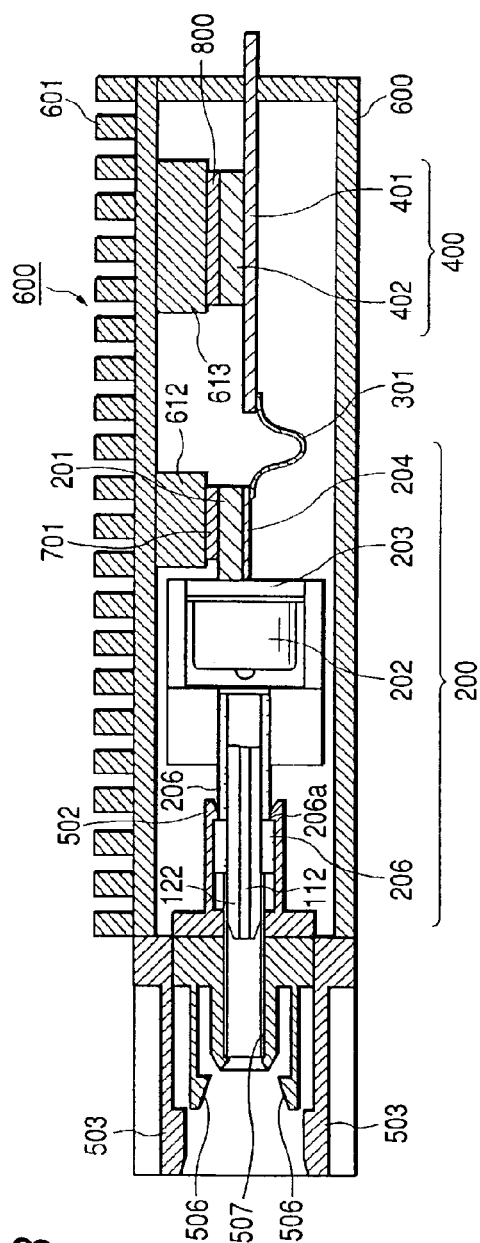

OPTICAL TRANSMISSION MODULE

FIELD OF THE INVENTION

The present invention relates to an optical transmission module, and, more particularly, to a receptacle type optical transmission module provided with an optical transmission module or an optical receiving module, or with the optical transmission module and the optical receiving module.

DESCRIPTION OF THE RELATED ART

A receptacle type optical transmission module integrates a coaxial can package that stores and seals a light emitting element or a light receiving element and a receptacle type optical connector in which a circuit board (a peripheral circuit or a communication control circuit of the light emitting element or the light receiving element) on which an electronic component is mounted is stored in a single housing and a receptacle type optical connector for externally connecting an optical fiber connector to the coaxial can package, with the housing.

An embodiment of the internal structure of the receptacle type optical transmission module is disclosed in Japanese Patent Laid-open No. 1995 (Hei 7)-104149, for instance. In the related art, a transmission module and a receiving module are contained in a coaxial can package, and a lead terminal formed in this coaxial can package and a printed circuit board (PC board) on which a peripheral circuit is mounted are connected with solder. Subsequently, they are secured to the housing on the top and bottom sides with screws or in a fit-in structure. At the same time, when the coaxial can package that works as a heating element is mechanically brought into contact with the housing on the top and bottom sides, to promote heat radiation to the housing.

SUMMARY OF THE INVENTION (OBJECT AND SUMMARY)

In the aforementioned conventional embodiment, however, because multiple lead terminals are provided in a coaxial can package, the area of a portion in which a lead wire of the can package is almost determined and the thickness of even the lead wire is almost fixed, the number of lead terminals cannot be increased any more. Accordingly, the application of the lead terminal to high-speed signal transmission that requires the can package in which a light emitting element and an LSI (large-scale integrated circuit) or a light receiving element and the LSI are accommodated in the same package respectively was difficult. Further, in the aforementioned lead terminal structure, because there is unevenness in the length of each lead terminal, it was difficult to match the characteristic impedance (normally approximately 50 Ω) of high-speed signal transmission wiring. Accordingly, in an actual condition, an optical module of the coaxial can package is used in the communication of not more than 2.5 gigabits per second. Further, electrically full ground is required in the vicinity of the high-speed signal transmission wiring to stably transmit a high-speed signal.

Still more, in the aforementioned conventional embodiment, a coaxial can package and a printed circuit board (PC board) are secured to the housing on the top and bottom sides with screws or in an insertion structure. Further, at the same time, when the coaxial can package that works as a heating element mechanically touches a post from the housing, heat is radiated. Because of a mechanical contact, however, there is no accuracy in the dimensional tolerance absorption contained in a heat-generating component and contact heat resistance is high. Further, because the heat radiation of a peripheral circuit component on the PC board is not considered, there was a limit to the heat radiation performance of a miniaturized high-speed signal optical transmission module.

Further, in the aforementioned conventional embodiment, because a transmission module does not use the can package that incorporates an isolator for removing reflected return light, a built-in isolator high-speed optical transmission module will not be provided.

A first object of the present invention is to provide a receptacle type optical transmission module that realizes the high-speed signal transmission using the coaxial can package that matches the characteristic impedance of the high-speed signal transmission wiring.

A second object of the present invention is to provide a receptacle type optical transmission module that realizes structure in which communication performance will not deteriorate due to the heat radiation inside the optical transmission module by efficiently accelerating the heat radiation from the peripheral circuit component on the coaxial can package or the PC board to the housing.

A third object of the present invention is to provide a receptacle type optical transmission module that incorporates an isolator having easy-to-assemble structure using the can package that incorporates the isolator for removing the reflected return light.

The present invention provides an optical transmission module that attains the aforementioned objects.

The optical transmission module of the present invention holds an optical element such as a light emitting element or a light receiving element in a coaxial can stem. At the same time, the optical transmission module forms the high-speed signal transmission wiring whose characteristic impedance matches on a ceramic PC board that penetrates this coaxial can stem and accommodates the optical element in the coaxial can package. Further, the ceramic PC board in which the high-speed signal transmission wiring is formed on one side, and the PC board in which the high-speed signal transmission wiring is formed on one side and the peripheral circuit component is mounted on the other side absorb the dimensional tolerance contained in each component and are wired and connected using a flexible PC board in which the high-speed transmission wiring is formed in the same manner.

Moreover, the optical transmission module of the present invention radiates the heat of the coaxial can package through a metal stem provided along the other side of the ceramic PC board. Accordingly, an elastic conductive heat-conducting material is provided between this metal stem and the housing in which a radiating fin is formed. Further, the elastic conductive heat-conducting material or an insulating heat-conducting material is interposed between the circuit component mounted on the other side of the PC board and the housing in which the radiating fin is formed and radiates the heat by reducing the contact heat resistance. Further, the present invention can absorb the dimensional tolerance of the component height contained in the heat-generating component according to the elasticity contained in the heat-conducting material, at assembly.

Moreover, according to the optical transmission module of the present invention, the high-speed signal transmission wiring arranged on one side of the ceramic PC board and the high-speed signal transmission wiring arranged on one side of the PC board are connected using the flexible PC board and heat is radiated from the other side of the ceramic PC board. At the same time, the heat of the peripheral circuit component mounted on the other side of the PC board is radiated.

Moreover, according to the optical transmission module of the present invention, a fitting structure is formed in the respective ferule and receptacle portion of the transmission module or the receiving module and can rotate in the direction of an optical axis. Consequently, the transmission module or the receiving module and the receptacle can easily be fitted and assembled and the dimensional tolerance in the direction of rotation contained in the transmission module or the receiving module can be absorbed.

These and other objects, features and advantages of the invention will be apparent from the following more particular description of preferred embodiments of the invention, as illustrated in the accompanying drawings.

BRIEF DESCRIPTION OF THE DRAWINGS

FIG. 2 is the cross section A1–A2 of FIG. 1; and

FIG. 3 is the cross section B1–B2 of FIG. 1.

DESCRIPTION OF THE PREFERRED EMBODIMENTS

Figure 1:
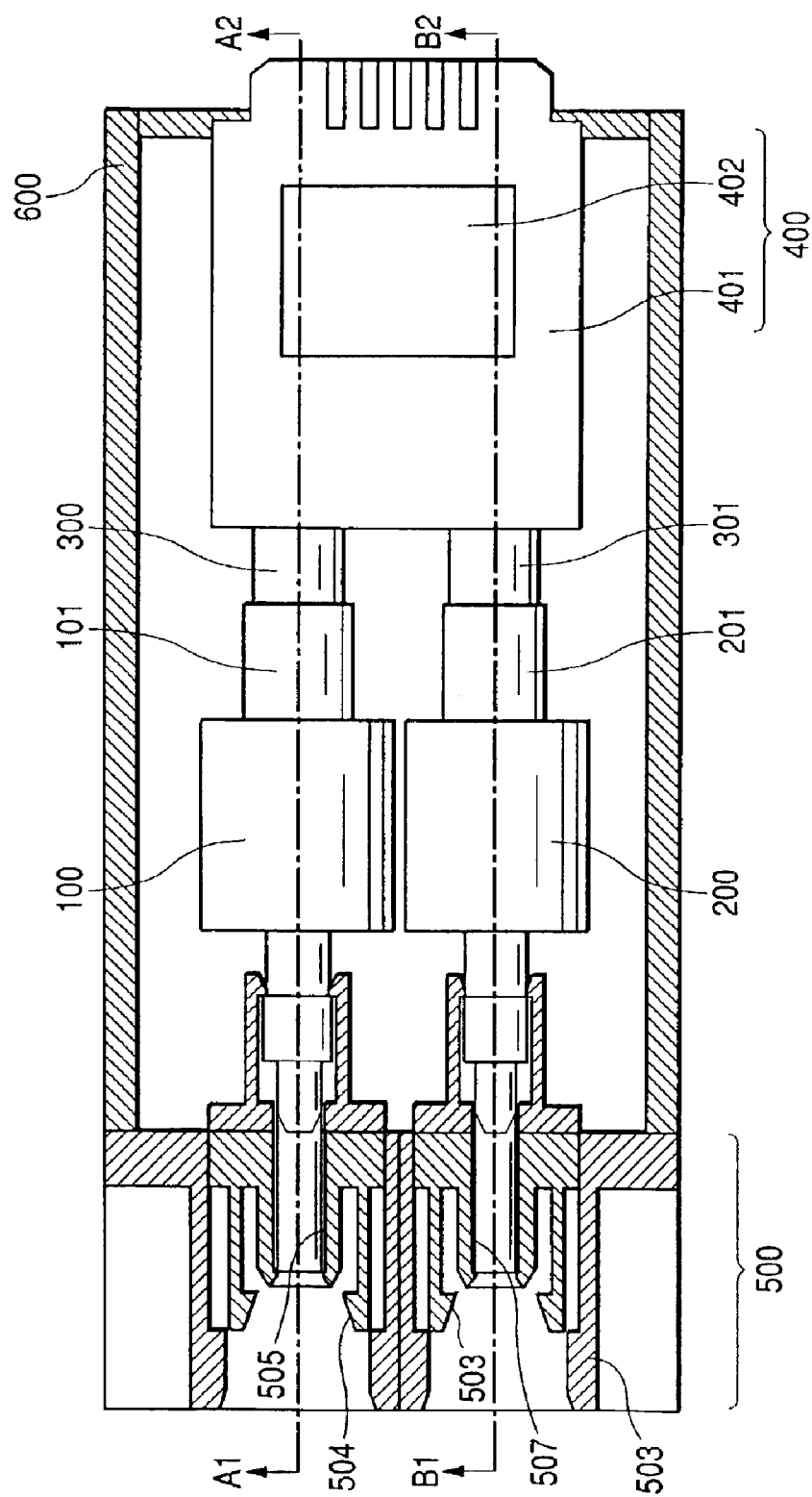
FIG. 1 is a partly cross sectional plan view showing an embodiment of a receptacle type optical transmission module according to the present invention.

Embodiments of the present invention will be described below.

FIG. 1 is a partly cross sectional plan view showing an embodiment of a receptacle type optical transmission module according to the present invention. FIG. 2 is the cross section A1–A2 of FIG. 1. FIG. 3 is the cross section B1–B2 of FIG. 1.

As shown in FIG. 1, this optical transmission module is constituted by storing a transmission module 100 or a receiving module 200, a printed circuit board (PC board) 400 on which a control circuit of each module is mounted, and a receptacle portion 500 for connecting an optical fiber from outside the optical transmission module in a housing 600.

In this embodiment, a single transmission module or receiving module and both the transmission and receiving modules are called optical communication modules.

As shown in FIGS. 1 to 3, the transmission module 100 mounts a light emitting element and an LSI (large-scale integrated circuit) in a coaxial can stem 103 and holds a ceramic PC board 104 and a metal stem 101 in the coaxial can stem 103. These light emitting element and LSI and part of the ceramic PC board 104 are accommodated in a coaxial can package 102. The receiving module 200 mounts the light emitting element and the LSI in a coaxial can stem 203 and holds a ceramic PC board 204 and a metal stem 201 in the coaxial can stem 203. These light emitting element and LSI and part of the ceramic PC board 204 are accommodated in a coaxial can package 202. Thus, the transmission module 100 and the receiving module 200 penetrate the ceramic PC boards 104, 204 that form a signal transmission line of each optical element and the metal stems 101, 201 for externally conducting the heat inside the can package into the coaxial can stems 103, 203. At this point, high-speed signal transmission wiring (not shown) whose characteristic impedance matches is formed on the ceramic PC boards 104, 204 that penetrate the coaxial can stems 103, 203.

The high-speed signal transmission wiring on the ceramic PC boards 104, 204 that penetrate the coaxial can stems 103, 203 is electrically wired and connected to the PC board 400 on which a control circuit is mounted through flexible PC boards 300, 301 whose characteristic impedance matches in the same manner using the high-speed signal transmission wiring. At this point, the wiring connection among the wiring arranged on the ceramic PC boards 104, 204, the wiring arranged on the flexible PC boards 300, 301, the wiring arranged on the PC board 400, and the wiring of the flexible PC boards 300, 301 are connected with solder. Further, this wiring connection can also be contact connection through an anisotropic conductive material. Even if misalignment occurs in the mounting location between the transmission module 100 and the PC board 400 and between the receiving module 200 and the PC board 400 due to component dimensional unevenness by using these flexible PC boards 300, 301, the amount of misalignment can be absorbed. This embodiment shows that the flexible PC boards 300, 301 in which the flexible PC board on a flat plate is previously formed into a cap shape, for instance, a conical or trapezoidal shape by making both ends of a flat plate type flexible PC board approach to each other are used. In this case, in the physical relationship between the transmission and receiving modules 100, 200 and the PC board 400, the wiring connection work is more simplified by absorbing the amount of misalignment in the horizontal direction more easily in particular. That is, even if the location of the transmission and receiving modules 100, 200 and the location of the PC board 400 are misaligned to the horizontal direction, the misalignment in this horizontal direction is absorbed by using the flexible PC boards 300, 301 and both the PC boards can be connected with solder.

Moreover, because the number of components and the number of wiring connection work spots can be reduced, a rigid flexible PC board with which the PC board 400 and the flexible PC boards 300, 301 are already integrated can also be used.

On the other hand, elastic conductive heat-conducting materials 700, 701 are interposed between the respective metal stems 101, 201 penetrating the coaxial can stems 103, 203 and respective posts 611, 612 of the housing 600, and heat radiation structure is constituted, in which the heat from the coaxial can packages 102, 202 is transmitted to a radiating fin 601 of the housing 600 via posts 611, 612. Further, the multiple radiating fins 601 for radiating the heat more efficiently are formed in this housing 600. Because these heat-conducting materials 700, 701 have elasticity and conductivity, the contact heat resistance can be reduced and the dimensional tolerance of the component height contained in the coaxial can packages 102, 202 can also be absorbed. Further, the stabilization of high-speed signal transmission quality can be realized simultaneously by obtaining electrical ground just under the ceramic PC boards 104, 204 whose high-speed signal transmission wiring is performed. Similarly, the heat radiation structure is used in which the heat of a circuit component that works as a heating element is transmitted to the radiating fin 601 of the housing 600 via a post 613 by making an elastic heat-conducting material 800 being interposed even between the circuit component mounted on the PC board 400 and the post 613 of the housing 600. This heat-conducting material 800 should be an electric conductive or insulating material according to the material and characteristics of the circuit component.

The heat radiation structure is used in which the heat is radiated from the metal stems 101, 201 penetrating the coaxial can stems 103, 203 to the housing 600 in which the radiating fin 601 is formed via the conductive heat-conducting materials 700, 701. The heat radiation structure is also used in which the heat is radiated from the circuit component mounted on the PC board 400 to the housing 600 in which the radiating fin 601 is formed via the heat-conducting material 800. The heat from the coaxial can packages 102, 202 and the heat from the circuit component mounted on the PC board are transmitted and radiated to the radiating fin 601 of the housing 600. The high-speed signal transmission wiring is provided on the side on which the heat radiation structure of the ceramic PC boards 104, 204 penetrating the coaxial can stems 103, 203 is provided, that is, on the opposite side of the side that touches the metal stems 101, 201. Further, a control circuit is mounted on the opposite side of the side on which the heat radiation structure of the PC board 400 is provided and the high-speed signal transmission wiring provided in the ceramic PC boards 104, 204 and the wiring of the control circuit provided in the PC board 400 are mutually wired and connected using the flexible PC boards 300, 301. That is, in this embodiment, the control circuit can be mounted by separating the heat radiation structure and the connection wiring structure into a mutually different side instead of providing them on the same side without deteriorating each performance to be attained. This is advantage even in assembly.

The receptacle portion 500 for connecting an optical fiber from outside the optical transmission module is stored in the same housing 600. Sleeves 505, 507 are provided in the receptacle portion 500.

In this embodiment, the transmission module 100 is constituted of the metal stem 101, the ceramic PC board 104, the coaxial can stem 103, the coaxial can package 102, a fiber capillary 121 that holds an optical fiber 111, an isolator 107 provided in contact with the optical fiber, and a conical ferule 106 held in the fiber capillary 121. Further, the receiving module 202 is constituted of the metal stem 201, the ceramic PC board 204, the coaxial can stem 203, the coaxial can package 202, a fiber capillary 122 that holds an optical fiber 112, and a conical ferule 206 held in the fiber capillary 122.

As shown in the drawing, the transmission module 100 and the receiving module 200 have the fiber capillaries 121, 122 inserted into the sleeves 505, 507 respectively and engaging portions 106a, 206a of the ferule 106, 206 are fitted in fitting portions 501, 502 of the receptacle portion 500 respectively. The modules can realize optical coupling that suppresses an optical connection loss when the fiber capillary portion (not shown) at the tip of optical connectors inserted from the outside respectively is pressed in the sleeves 505, 507. In the transmission and receiving modules 100, 200, a light emitting element or a light receiving element and the ferules 106, 206 are adjusted and assembled axially. On the external surface of the ferules 106, 206 and at the rear end of the receptacle 500, the contour of the ferules 106, 206 is pressed in the sleeves 505, 507 of the receptacle 500 and the fitting portions 501, 502 such as pawl structures are formed respectively so that they can be secured in the location where optical coupling on an optical datum plane is enabled. Further, the structure of these fitting portions 501, 502 forms simple fitting structure in which they are locked by merely inserting the ferules 106, 206 to the receptacle portion 500 from the direction of an optical axis. Further, the transmission module 100 can be applied for a built-in isolator optical transmission module that can remove reflected return light and stabilize the characteristics of transmitted light by incorporating the isolator 107 whose direction of polarization is previously positioned and secured at axial adjustment with the light emitting element, in the ferule 106.

In this embodiment, in the fitting structure between the engaging portions 106a, 206a of the ferules 106, 206 and the fitting portions 501, 502 formed in the receptacle portion 500, because ferule engaging portions 106a, 206a that are provided on the ferules 106, 206 are conical, they are not secured at the fixed location when fitted. That is, conventionally, because the ferule-engaging portion was formed into a square-shaped curb shape and the fitting portion was also formed into almost the same shape, the ferule could not rotate when fitted. To the contrary, in this embodiment, the ferule-engaging portions 106a, 206a can be rotated within the side at a right angle to an optical axis by making them conical and the dimensional tolerance of the direction of rotation contained in each of the transmission and receiving modules 100, 200 can be absorbed. Besides, in the present invention, the ferule-engaging portions 106a, 206a need not always be conical. In short, when the ferules are fitted with the fitting portions 501, 502, the transmission and receiving modules 100, 200 should be rotatable.

By using such constitution, the ferules rotate with respect to the optical axis even if the ceramic PC boards 104, 204 and the metal stems 101, 201 penetrating the coaxial can stems 103, 203 are of a plate-type shape as shown in this embodiment, the dimensional tolerance of the direction can be absorbed. That is, the metal stems 101, 201 can be arranged in parallel to the posts 611, 612. Thus, the metal stems 101, 201 that radiate the heat to the housing 600 via the conductive heat-conducting materials 700, 701 can adjust the location so that they can be horizontal (or parallel) to the opposite side of the housing 600. Accordingly, heat radiation performance will not be deteriorated.

Moreover, because the ceramic PC boards 104, 204 wired and connected with the PC board 400 using the flexible PC boards 300, 301 can be wired and connected to the PC board 400 in the horizontal position in the same manner, the torsion of the flexible PC boards 300, 301 is reduced and the reliability of connection can be ensured.

Moreover, in the transmission module 100 that incorporates the isolator 107, because the isolator 107 whose direction of polarization is previously positioned and fixed at the axial adjustment with the optical emitting element is incorporated in the ferule 106, the direction of polarization will not be affected even if the ferule 106 is rotated.

As described above, according to the present invention, a receptacle type optical transmission module that enables high-speed signal transmission can be provided by realizing the wiring connection between the transmission module and the PC board and between the receiving module and the PC board using the flexible PC board wired for high-speed signal transmission whose characteristic impedance matches.

Moreover, even if the misalignment due to component dimensional unevenness occurs in the mounting location by using the flexible PC board for the wiring connection between the transmission module and the PC board and between the receiving module and the PC board, the amount of misalignment can be absorbed and the reliability of electrical wiring connection can be ensured.

Moreover, the reliability in the operation of the optical transmission module can be improved by transmitting the heat generated from the transmission and receiving modules to the housing through an elastic conductive heat-conducting material and transmitting even the heat generated from the circuit component on the PC board to the housing through the elastic heat-conducting material.

Moreover, because the wiring connection location in which the flexible PC board is used and the heat radiation structure location in which the heat is transmitted to the housing via the heat-conducting material are separated not in the direction but on a different side using the flexible PC board, the control circuit can be mounted without deteriorating each performance. Consequently, the performance can be ensured and the assembly can be improved.

Moreover, the fitting structure is formed in the respective ferule and receptacle portion contained in the transmission module or receiving module and the module can be rotated to the direction of an optical axis. Consequently, the dimensional tolerance of the direction of rotation contained in the transmission module or receiving module is absorbed and the ferule can be fitted and assembled easily in the receptacle. The assembly can be improved, the heat radiation performance can be ensured, and the reliability of electrical wiring connection can be ensured.

Moreover, a built-in isolator receptacle type optical transmission module can be provided by using the coaxial can package that incorporates the isolator in the ferule.

The invention may be embodied in other specific forms without departing from the spirit or essential characteristics thereof. The present embodiment is therefore to be considered in all respects as illustrative and not restrictive, the scope of the invention being indicated by the appended rather than by the foregoing description and all changes which come within the meaning and range of equivalency of the claims are therefore intended to be embraced therein.

What is claimed is:

1. An optical transmission module, comprising:
   a housing that has a radiating fin;
   a receptacle portion that is coupled with said housing and for connecting an external optical fiber; and
   an optical communication module that is provided with a coaxial can stem that mounts an optical element, a coaxial can package held in said coaxial can stem so that said optical element can be stored, and a ceramic PC board, in which a signal transmission line of said optical element is mounted on one side, wherein said optical communication module is accommodated in said housing and the heat inside said coaxial can package is radiated through the radiating fin of the housing from the other side of said ceramic PC board.

2. An optical transmission module according to claim 1, wherein said optical element comprises a light emitting element and said optical communication module includes a transmission module.

3. An optical transmission module according to claim 1, wherein said optical element comprises a light receiving element and said optical communication module includes a receiving module.

4. An optical transmission module according to claim 1, further comprising a metal stem that is arranged on the other side on which a signal transmission line of said ceramic PC board is not formed and penetrating said coaxial can stem, wherein the heat inside said coaxial can package is transmitted and radiated to said housing via said metal stem.

5. An optical transmission module according to claim 4, further comprising a post within the side on which a radiating fin of said housing is provided corresponding to a portion in which said metal stem is arranged, wherein an elastic heat-conducting material is interposed between said metal stem and said post and the heat of said metal stem is radiated from said radiating fin via said heat-conducting material and said post.

6. An optical transmission module according to claim 1, further comprising a printed circuit board (PC board) in which a signal transmission line is formed on one side and a peripheral circuit component of said optical element is mounted on the other side, wherein said PC board is accommodated in said housing and the heat of said peripheral circuit component of said PC board is transmitted and radiated to said housing.

7. An optical transmission module according to claim 6, further comprising a post inside the side on which a radiating fin of said housing is provided corresponding to a portion in which a peripheral circuit component mounted on said PC board is arranged, wherein an elastic heat-conducting material is interposed between said peripheral circuit component and said post and the heat of said peripheral circuit component is radiated from said radiating fin via said heat-conducting material and said post.

8. An optical transmission module according to claim 6, wherein the side on which said signal transmission line of said ceramic PC board is formed and the side on which said signal transmission line of said PC board is formed are connected using a flexible PC board.

9. An optical transmission module according to claim 1, wherein said receptacle portion is provided in a housing end on the opposite side of the side on which said coaxial can stem of said optical communication module is provided.

10. An optical transmission module, comprising:
    a housing that has a radiating fin;
    a receptacle portion that is coupled with said housing and for connecting an external optical fiber;
    a transmission module having a first ceramic PC board that penetrates a first coaxial can stem that holds a light emitting element, a first coaxial can package held in said first coaxial can stem so that the light emitting element can be stored and in which a signal transmission line of said light emitting element is formed on one side; and
    a receiving module having a second ceramic PC board that penetrates a second coaxial can stem that holds a light receiving element, a second coaxial can package held in said second coaxial can stem so that the light receiving element can be stored and in which the signal transmission line of said light receiving element is formed on one side, wherein said transmission module and said receiving module are accommodated in said housing and the heat inside said first and second coaxial can stems is radiated through the radiating fin of the housing from the other side of said first and second coaxial can packages respectively.

11. An optical transmission module, comprising:
    a housing that has a radiating fin;
    an optical communication module that is provided with a coaxial can stem that holds an optical element, a coaxial can package held in said coaxial can stem so that said optical element can be accommodated, a ceramic PC board that penetrates said coaxial can stem and in which a signal transmission line of said optical element is formed, a fiber capillary provided on the opposite side of the side on which said coaxial can package is provided to said can package and that contains an optical fiber, and an optical transmission module having a ferule that is provided on the external surface of said capillary and has an engaging portion; and a receptacle portion that is coupled with said housing and has a portion to which an external optical fiber is connected and an fitting portion for fitting with said ferule, wherein said communication module is fitted with said receptacle so as to rotate.

12. An optical transmission module according to claim 11, wherein said optical element comprises a light emitting element and said optical communication module includes a transmission module, further comprising an isolator held in said fiber capillary inside said ferule.

13. An optical transmission module according to claim 11, wherein said optical element comprises a light receiving element and said optical communication module includes a receiving module.

14. An optical transmission module according to claim 11, wherein said receptacle portion provides a sleeve into which an external optical fiber is inserted and said fiber capillary of said optical communication module is inserted in said sleeve.

15. The optical transmission module according to claim 11, further comprising a metal stem that is arranged on the other side on which the signal transmission line of said ceramic PC board is not formed and penetrates said coaxial can stem, wherein the heat inside said coaxial can package is transmitted and radiated via said metal stem.

16. An optical transmission module according to claim 15, further comprising a post within the side on which a radiating fin of said housing is provided corresponding to a portion in which said metal stem is arranged, wherein an elastic heat-conducting material is interposed between said metal stem and said post and the heat of said metal stem is radiated from said radiating fin via said heat-conducting material and said post.

17. An optical transmission module according to claim 11, further comprising a PC board in which a signal transmission line is formed on one side and a peripheral circuit component of said optical element is mounted on the other side, wherein said PC board is accommodated in said housing and the heat of said peripheral circuit component of said PC board is transmitted and radiated to said housing.

18. An optical transmission module according to claim 17, further comprising a post within the side on which a radiating fin of said housing is provided corresponding to a portion in which a peripheral circuit component mounted on said PC board is arranged, wherein an elastic heat-conducting material is interposed between said peripheral circuit component and said post and the heat of said peripheral circuit component is radiated from said radiating fin via said heat-conducting material and said post.

19. An optical transmission module according to claim 17, wherein the side on which said signal transmission line of said ceramic PC board is formed and the side on which said signal transmission line of said PC board is formed are connected using a flexible PC board.

20. An optical transmission module according to claim 17, wherein said optical communication module is rotated to said receptacle portion and said ceramic PC board is arranged so as to become parallel to said PC board.

* * * * *